2,796,894

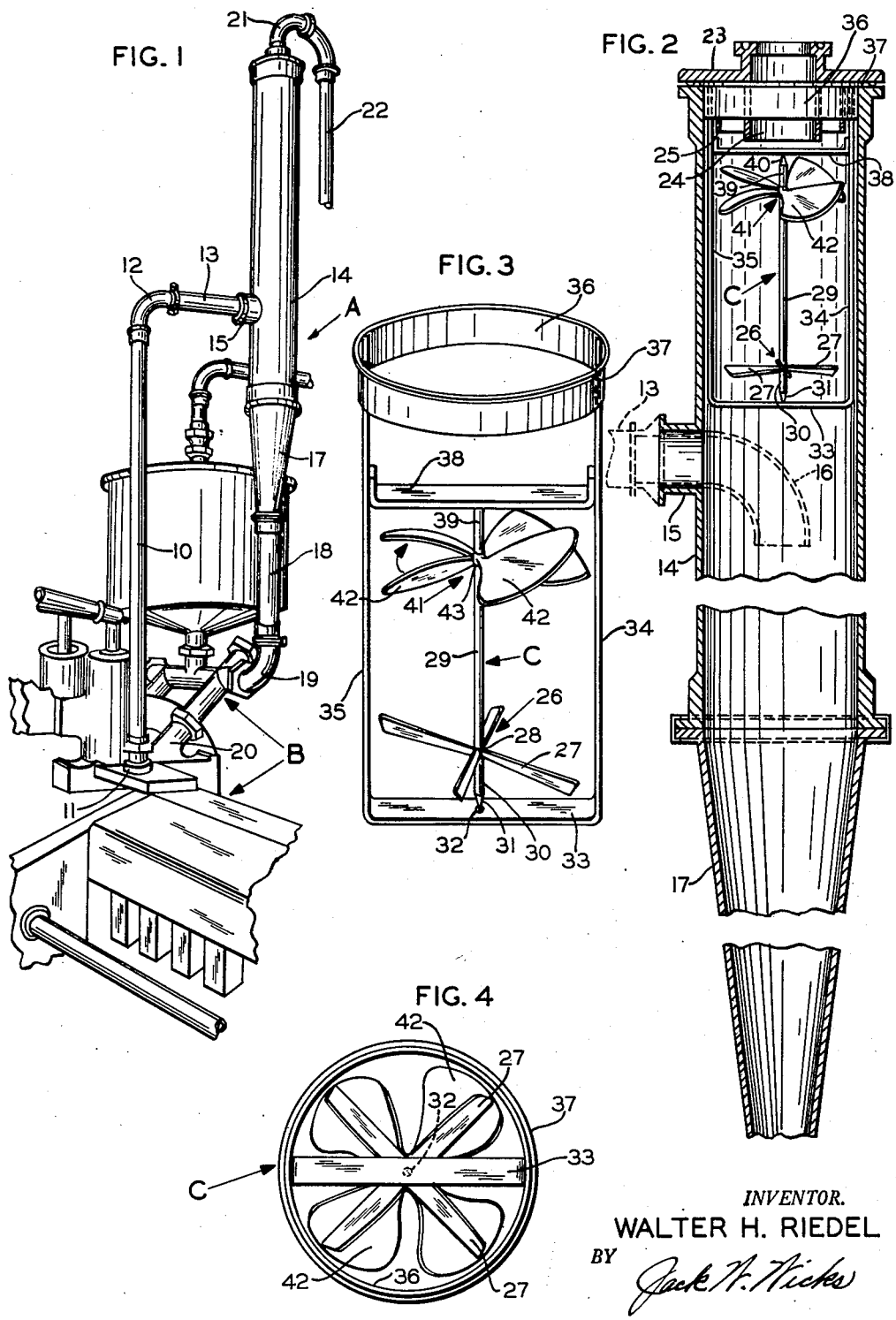

DEFOAMER FOR MILK FILLING MACHINES

Walter H. Riedel, St. Paul, Minn.; Marie A. Riedel and First Trust Company of Saint Paul, executors of said Walter H. Riedel, deceased Application November 26, 1954, Serial No. 471,280

5 Claims. (Cl. 141—121)

My invention relates to an improvement in a defoamer for a filling machine for milk containers and more particularly to a device which draws off the foam from the top of the container as it is filled by means of a vacuum in conjunction with my rotating beater member positioned in the vacuum stream which returns the foam to a liquid state. My device draws off the milk foam and condenses the same into liquid milk which is returned to the filling machine with little loss or waste of milk and is an improvement over my defoamer disclosed in my pending application Serial No. 459,186, filed September 29, 1954.

It is an object of my invention to provide a defoamer including a tubular vacuum defoamer housing into which the foam is drawn and in which I provide a beater member rotated by the effect of the vacuum. As excess foam, not taken care of by the vacuum defoamer tube and collector member, works up in the vacuum stream and strikes the blades of the beater member the same is flung outwardly and downwardly against the wall of the vacuum defoamer tube where it is returned to liquid form and by gravity the same is returned to the filling tube for the milk containers. As a result there is virtually no loss of milk through foam, as my device removes the foam from the top of the containers just prior to sealing, condenses the same back into liquid milk which is fed back into filling apparatus of the filling machine. In accomplishing the above, the milk is not exposed to the outer atmosphere.

It is apparent that my device may be used to collect foam and return it to liquid form in any liquid filling machine where foam tends to build up on filling containers.

It is also an object of my invention to provide a rotatable beater member placed in a large casing interposed in a vacuum line where a sudden reduction in pressure is caused, thereby causing the foam entering the casing to be suddenly condensed into liquid. The foam working up the vacuum stream will strike the beater blades and be flung outwardly to the walls of the casing where it runs down in liquid form and due to gravity is returned to the filling machine.

It is an additional object to drive the beater blades by means of fan blades of larger area and which are mounted on the shaft on which the beater blades are mounted, and as the fan blades are rotated by the vacuum so are the beater blades. The rotatable beater blades may be driven by other suitable means.

It is a further feature to have the pitch of the blades of the beater just opposite to the pitch of the blades of the driving fan member so that the foam is driven downwardly and outwardly. The blades of the beater member have an area considerably less than that of the blades of the driving fan member so that the former will be driven although the angle of the blades of the same is opposite to that of the driving fan member. With my device the loss of milk through foam is eliminated. With present day filling machines the foam collected is caught in open containers as such and discarded.

The invention will appear more clearly from the following detailed description when taken in connection with the accompanying drawings, showing by way of example a preferred embodiment of the inventive idea wherein like numerals are employed to designate like parts throughout.

In the drawings forming part of the application:

Figure 1 is a perspective view of my defoamer device in connection with a portion of a milk bottle filling machine.

Figure 2 is a vertical cross section of the large defoaming tube with the beater member shown in full lines, a portion of the defoaming tube being broken away.

Figure 3 is an enlarged side view of the beater member removed from the defoamer tube.

Figure 4 is a top plan view of the beater member shown in Figure 3.

My defoamer for milk filling machines A is adapted to draw foam off the top of a container being filled, condense it back into liquid milk and return the milk to the filling machine. My device A is connected to the filling machine indicated as B and is composed of the vertical vacuum tube 10, the bottom end 11 of which is positioned directly above a container which has just been filled and which has foam on the top thereof due to filling.

The filling machine B receives the containers which pass under the filling mechanism. The vacuum tube 10 extends vertically and is connected to the elbow 12 which in turn is connected to the horizontal section 13. The section 13 is connected to the defoaming tube 14 by means of the connector 15 with the elbow member 16 extending into the tube 14. The elbow 16 extends into the tube 14 in a downward direction thereby directing the foam downwardly toward the collector portion 17.

As the foam enters the relatively large tube 14 from the elbow member 16, the same is condensed into milk due to the decrease in pressure. The milk runs down the walls of the collector funnel portion 17, through the section 18 to which is connected the elbow 19. The elbow 19 is in turn connected to the container filler member 20 thereby returning the milk to the filler member which fills the containers as they pass through the machine. At the top of the defoaming tube 14 is connected the elbow 21 which leads to the line 22 which is connected to a vacuum pump not shown in the drawings.

I further provide the cap member 23 which is secured to the top of the tube 14 and has depending therefrom and into the tube 14 the drip flanges 24 and 25. Some of the foam rises to the flanges 24 and 25 on which the milk collects around the top of the tube 14. The milk then drips downwardly to the collector funnel 17 in liquid form.

To further take care of the foam that tends to be drawn to the top of the tube 14 instead of going down to the funnel collector 14, I provide the beater unit C which includes the beater fan member 26 which is composed of the relatively narrow rectangularly shaped blades 27. The blades 27 are connected at the central portion or hub 28 which is connected to the rotatable shaft 29. The lower end 30 of the shaft 29 is needle pointed as at 31 which is positioned in the small hole 32 to provide a lower bearing for the shaft 29. The hole 32 is formed in the lower cross member 33 forming part of the side frame members 34 and 35 which tend to position the beater unit C inside the upper portion of the tube 14.

Secured to the upper ends of the side frame members 34 and 35 is the circular collar member 36 positioned within the upper end of the tube 14 with the annular flange portion 37 positioned between the top of the tube 14 and the cap 23. I further provide the upper cross bar 38 which is secured to the side frame members 34 and 35. The upper end 39 of the shaft 29 is also formed with a needle point portion 40 which is positioned in a hole formed in the underside of the cross bar 38 to form a bearing as in the lower cross member 33. Thus, the shaft 29 is free to rotate on the pointed portions 31 and 40.

Secured on the upper end 39 of the shaft 29 is the driving fan 41 composed of the blades 42 connected at the hub portion 43. Due to the effect of the vacuum on the blades 42 the driving fan 41 is rotated and as a result the beater fan blades 27 are rotated in the same direction as indicated by the arrows in Figure 3.

Of primary importance, the angular position or pitch of the blades 27 is just the opposite of the angular position or pitch of the blades 42. The pitch of the blades 42 must be such that the vacuum stream rotates the shaft 29 as the stream passes upwardly, but the pitch of the blades 27 must be as illustrated and described so that the rising foam striking the blades 27 will be beaten downwardly and outwardly to strike the wall of the tube 14 where it condenses to milk and runs down to the collector funnel member 17. If the angle or pitch of the blades 27 was the same as that of the blades 42, the foam would merely be carried on out to the line 22.

With my device the driving fan rotates the fan 26 by means of vacuum and the blades 27 of the fan 26 due to their angular disposition beat the foam outwardly and downwardly to the wall of the tube 14 thereby condensing the foam which rises toward the top of the tube into milk and the same thereby proceeds to the funnel 17 and thence to the filling machine as above described. A good portion of the foam entering the tube 14 through the elbow 16 condenses into milk and is returned to the filling machine, but some of the foam tends to be drawn toward the top of the tube 14. The foam which tends to travel upwardly from the elbow 16 toward the top of the tube 14 is condensed by means of my beater unit C as heretofore explained.

The tube 14 is of fairly large diameter to give a reduction in pressure and considerable surface for condensing the foam back into liquid milk.

I have thus provided a highly efficient defoamer device which is easily fabricated from a minimum of parts. It is apparent that my device may be used in conjunction with filling machines for other types of liquid wherein foam forms upon filling.

The invention is not to be understood as restricted to the details set forth since these may be modified within the scope of the appended claims without departing from the spirit and scope of the invention.

Having thus described the invention, what I claim as new and desire to secure by Letters Patent is:

1. In a device for reducing foam to the liquid state, a defoamer tube, an intake tube leading to said defoamer tube, a vacuum supply tube leading from said defoamer tube, means for creating a vacuum in said tubes, a collector funnel member connected to the lower end of said defoamer tube, a shaft rotatably and axially mounted in said defoamer tube at a point above said intake tube, a driving fan mounted on said shaft with the blades thereof angularly disposed to the longitudinal axis of said shaft, a beater fan mounted on said shaft below said driving fan with the blades of said beater fan having a pitch disposition opposite to that of said driving fan for driving foam drawn into said defoamer tube outwardly and downwardly against the walls of said defoamer tube to travel to said collector funnel in substantially liquid form to be returned to a filling machine.

2. In a defoamer and collector device for filling machines for liquids, a single cylindrical defoamer tube, means for creating a vacuum in said defoamer tube, means for directing foam to said defoamer tube, a beater fan rotatably positioned in said defoamer tube, a driving fan positioned in said tube and rotated by the effect of the vacuum created and connected to said beater fan to drive the same and direct foam toward the wall of said defoamer tube to condense the same into a liquid, and means for directing the liquid formed back to a filling machine.

3. In a defoamer and collector device, a defoamer tube, means for directing foam into said defoamer tube, vacuum means for drawing the foam into said defoamer tube, a driving fan having blades rotatably mounted in said defoamer tube and rotated by the effect of the vacuum created therein, a beater fan having blades, the pitch of which is opposite to that of said driver fan blades and connected to said driver fan adapted to direct foam downwardly and outwardly against the wall of the defoamer tube as the foam strikes the beater fan, and liquid collecting means formed on the lower end of said defoamer tube.

4. In a device for returning foam to a liquid state for filling machines, a vacuum defoamer tube, a line for directing foam to said defoamer tube, vacuum means connected to said defoamer tube to draw foam through said foam directing line into said defoamer tube, an elbow member connecting said foam directing line to the interior of said defoamer tube, said elbow member extending downwardly in said defoamer tube to direct foam downwardly in said tube, a funnel member connected to the bottom of said defoamer tube for directing the liquid formed back to a container filling machine, a driver fan rotatably mounted in said defoamer tube adapted to be rotated by the effect of the vacuum, a beater fan connected to said driver fan nand adapted to be driven thereby, the pitch of said beater fan blades being opposite to that of said driver fan, a closure member connected to the top of said defoamer tube, annular drip flanges connected to the inside of said closure member to collect any foam reaching the top of said defoamer tube.

5. The combination of a device for filling containers with liquid and a defoamer and liquid collector device, said defoamer and liquid collector comprising a vacuum defoamer tube, a vacuum line for carrying foam to said defoamer tube, a vacuum supply line connected to said defoamer tube for creating a vacuum in said defoamer tube and said carrying line, a driver fan rotatably mounted in said defoamer tube above said foam carrying line, a beater fan connected to said driver fan and adapted to be rotated thereby, the pitch of the blades of said beater fan being opposite to those of said driver fan, and means connected to the bottom of said defoamer tube for returning the liquid to the filling device.

References Cited in the file of this patent
UNITED STATES PATENTS

| | | |
|---|---|---|
| 1,697,201 | Muller | Jan. 1, 1929 |
| 1,745,114 | Oishei et al. | Jan. 28, 1930 |
| 1,926,527 | Cornell, Jr. | Sept. 12, 1930 |
| 2,171,853 | Kurtzbein | Sept. 5, 1939 |